United States Patent
Li

(10) Patent No.: US 8,880,916 B2
(45) Date of Patent: Nov. 4, 2014

(54) CIRCUITS AND METHODS FOR CONTROLLING BATTERY MANAGEMENT SYSTEMS

(75) Inventor: Guoxing Li, Sunnyvale, CA (US)

(73) Assignee: O2Micro, Inc., Santa Clara, CA (US)

( * ) Notice: Subject to any disclaimer, the term of this patent is extended or adjusted under 35 U.S.C. 154(b) by 243 days.

(21) Appl. No.: 13/559,150

(22) Filed: Jul. 26, 2012

(65) Prior Publication Data

US 2013/0042130 A1    Feb. 14, 2013

Related U.S. Application Data

(60) Provisional application No. 61/521,513, filed on Aug. 9, 2011.

(51) Int. Cl.
     *G06F 1/00*      (2006.01)
     *H02J 7/00*      (2006.01)
     *G06F 1/26*      (2006.01)

(52) U.S. Cl.
     CPC ............... *G06F 1/263* (2013.01); *H02J 7/0086* (2013.01); *H02J 2007/0098* (2013.01)
     USPC ........................................................ 713/300

(58) Field of Classification Search
     CPC .. G06F 1/263; H02J 7/0086; H02J 2007/0098
     USPC ........................................................ 713/300
     See application file for complete search history.

(56) References Cited

U.S. PATENT DOCUMENTS

| | | | |
|---|---|---|---|
| 5,532,524 A * | 7/1996 | Townsley et al. | 307/64 |
| 6,463,545 B1 * | 10/2002 | Fisher et al. | 713/340 |
| 2007/0257642 A1 | 11/2007 | Xiao et al. | |
| 2010/0097118 A1 * | 4/2010 | Wang et al. | 327/427 |
| 2013/0249279 A1 * | 9/2013 | Sogabe | 307/9.1 |

FOREIGN PATENT DOCUMENTS

| | | |
|---|---|---|
| CN | 1441510 A | 9/2003 |
| TW | 200849766 A | 12/2008 |

* cited by examiner

*Primary Examiner* — Mark Connolly

(57) ABSTRACT

A controller for a battery management system includes a first terminal, a second terminal, and communication circuitry. The first terminal receives power from a battery in the battery management system. The second terminal receives a clock signal. The communication circuitry coupled to the first and second terminals detects the clock signal, and generates a first switching signal according to a result of detecting the clock signal to control the battery management system to switch from operating in a ship mode to operating in a non-ship mode according to the first switching signal. The detecting and generating are performed with the battery management system in the ship mode. The battery management system disables controlling of charging and discharging of the battery in the ship mode, and the battery management system enables controlling of charging and discharging of the battery in the non-ship mode.

20 Claims, 9 Drawing Sheets

CIRCUITS AND METHODS FOR CONTROLLING BATTERY MANAGEMENT SYSTEMS

RELATED APPLICATION

This application claims priority to U.S. Provisional Application No. 61/521,513, entitled "Circuits and Methods for Controlling Battery Management Systems," filed on Aug. 9, 2011, which is hereby incorporated by reference in its entirety.

BACKGROUND

FIG. 1 shows a conventional host system 100 including a host 120 (e.g., a mainboard of a notebook computer) and battery management systems 140 and 160. The host 120 can instruct the battery management system 140 to provide power to the host 120 or the battery management system 160, or receive power from a charger, by sending a request signal to the battery management system 140. The battery management system 140 responds to the request signal and controls charging and discharging of a battery in the battery management system 140. The host 120 can also control the power flow for the battery management system 160 in a similar manner.

FIG. 2 shows a block diagram of the battery management system 140. FIG. 2 is described in combination with FIG. 1. The battery management system 140 includes a battery 220, a controller 280, switches CFET and DFET, and terminals PACK+ and PACK−. The controller 280 and the battery management system 140 can operate in a ship mode or a normal mode. The controller 280 includes an amplifier 292, a comparator 294, a low-dropout regulator (LDO) 286, and a bus engine 288. The LDO 286 generates a reference voltage, and the bus engine 288 communicates with the host 120. In the ship mode, the LDO 286 and the bus engine 288 are disabled, and the controller 280 disables charging and discharging of the battery 220 by turning off the switches CFET and DFET. In the normal mode, the LDO 286 and the bus engine 288 are enabled, the bus engine 288 communicates with the host 120, and the controller 280 controls charging and discharging of the battery 220 by controlling the switches CFET and DFET.

In the ship mode, when the battery management system 140 receives a request signal that instructs the battery 220 to be charged or discharged, the host 120 controls a battery in the battery management system 160 to provide power to the PACK+ terminal. The controller 280 compares a voltage $V_{PACK+}$ at the terminal PACK+ with a voltage $V_{BAT}$, the total of cell voltages in the battery 220. If the voltage $V_{PACK+}$ is greater than the voltage $V_{BAT}$, and a difference between the voltage $V_{PACK+}$ and the voltage $V_{BAT}$ is greater than a threshold $V_{THR}$, the controller 280 switches to the normal mode. Thus, the battery 220 is charged or discharged under the control of the controller 280.

More specifically, after the PACK+ terminal is powered in response to the request signal, the amplifier 292 generates a signal ERR indicative of the difference between the voltage $V_{PACK+}$ and the voltage $V_{BAT}$, and the comparator 294 compares the signal ERR with the threshold $V_{THR}$. If the signal ERR is greater than the threshold $V_{THR}$, the controller 280 switches to the normal mode.

Disadvantageously, when the host 120 instructs the battery management system 140 to enter the normal mode, e.g., by controlling the battery management system 160 to provide power to the PACK+ terminal, the voltage $V_{PACK+}$ at the PACK+ terminal may be less than the voltage $V_{BAT}$. Accordingly, the controller 280 may not be switched to the normal mode to respond to the request signal.

In addition, when the host 120 instructs the battery management system 140 to enter the ship mode, the battery in the battery management system 160, under the control of the host 120, stops providing power to the PACK+ terminal. However, due to parasitic capacitance at the terminal PACK+, the voltage $V_{PACK+}$ may remain greater than the voltage $V_{BAT}$, and the signal ERR may remain greater than the threshold $V_{THR}$. Thus, the battery management system 140 may be incorrectly switched from the ship mode to the normal mode.

Moreover, if the battery management system 140 is in the ship mode and is plugged into the host 120 while the host is already powered on, the host 120 may not be able to provide power to the terminal PACK+ to activate the battery management system 140. For example, the host 120 needs to communicate with the bus engine 288 in order to verify that the battery management system 140 is the battery management system that the host 120 requests to activate. However, the LDO 286, which is the power source of the bus engine 288, is disabled in the ship mode; therefore, the bus engine 288 is disabled and cannot communicate with the host 120 in the ship mode. Thus, the host 120 cannot verify that the battery management system 140 is the battery management system that the host 120 requests to activate. Thus, the host 120 may not provide power to the terminal PACK+, and the voltage $V_{PACK+}$ may not be greater than the voltage $V_{BAT}$. Consequently, the battery management system 140 may not be switched from the ship node to the normal mode.

SUMMARY

In one embodiment, a controller for a battery management system includes a first terminal, a second terminal, and communication circuitry. The first terminal receives power from a battery in the battery management system. The second terminal receives a clock signal. The communication circuitry detects the clock signal, and generates a first switching signal according to a result of detecting the clock signal to control the battery management system to switch from operating in a ship mode to operating in a non-ship mode according to the first switching signal. The detecting and generating are performed with the battery management system in the ship mode. The battery management system disables controlling of charging and discharging of the battery in the ship mode, and the battery management system enables controlling of charging and discharging of the battery in the non-ship mode. Thus, the battery management system can communicate with the host when the battery management system is in the ship mode and is activated.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Reference will now be made in detail to the embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments in accordance with the present invention provide circuits and methods for controlling battery management systems. A battery management system (BMS) includes a battery and a controller for controlling charging and discharging of the battery. In one embodiment, the controller controls the BMS to switch from operating in a ship mode to operating in a non-ship mode based on a reference voltage that is less than a total of cell voltages of the battery. The ship mode may also be known as the shutdown mode or the deep sleep mode. The non-ship mode includes a normal mode. Advantageously, if the controller receives a request signal to switch the BMS from operating in the ship mode to operating in the normal mode, the controller can perform the switching operation properly. In addition, the controller can control the BMS to switch from operating in a ship mode to operating in a normal mode based on a variation of a terminal voltage of the battery management system. Advantageously, if the controller receives a request to enter the ship mode, the controller can enter the ship mode properly, and can also avoid incorrectly switching from the ship mode to the normal mode.

Furthermore, in another embodiment, the controller can switch from operating in the ship mode to operating in the normal mode based on communication with a host. Advantageously, when the host instructs the battery management system to enter the normal mode, a communication circuit that is in the battery management system and that communicates with the host can be enabled.

The battery, as mentioned herein, can be, but is not limited to, a Lithium Ion battery, a Lead Acid battery, or a solar cell battery.

Figure 1:
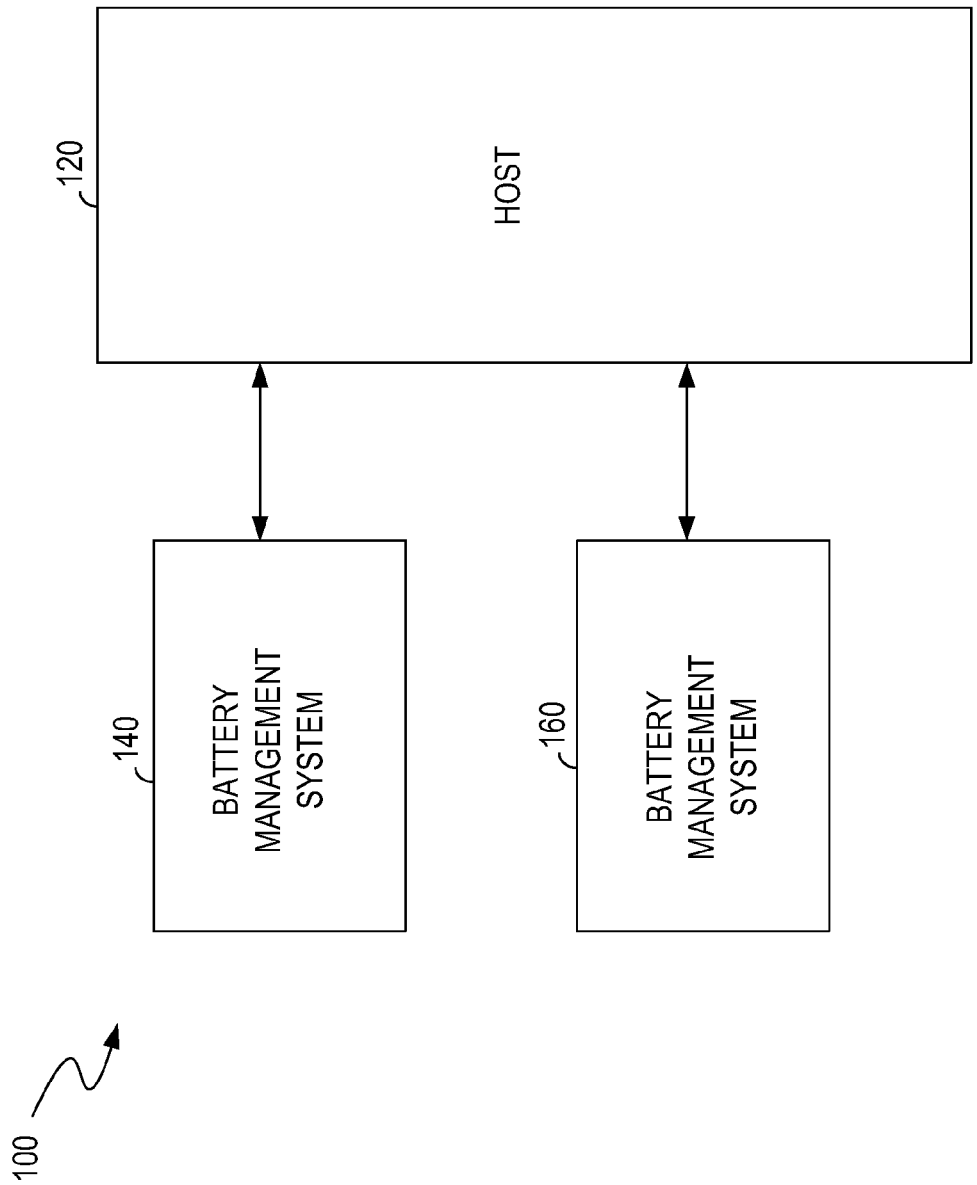
FIG. 1 shows a conventional host system.
Figure 2:
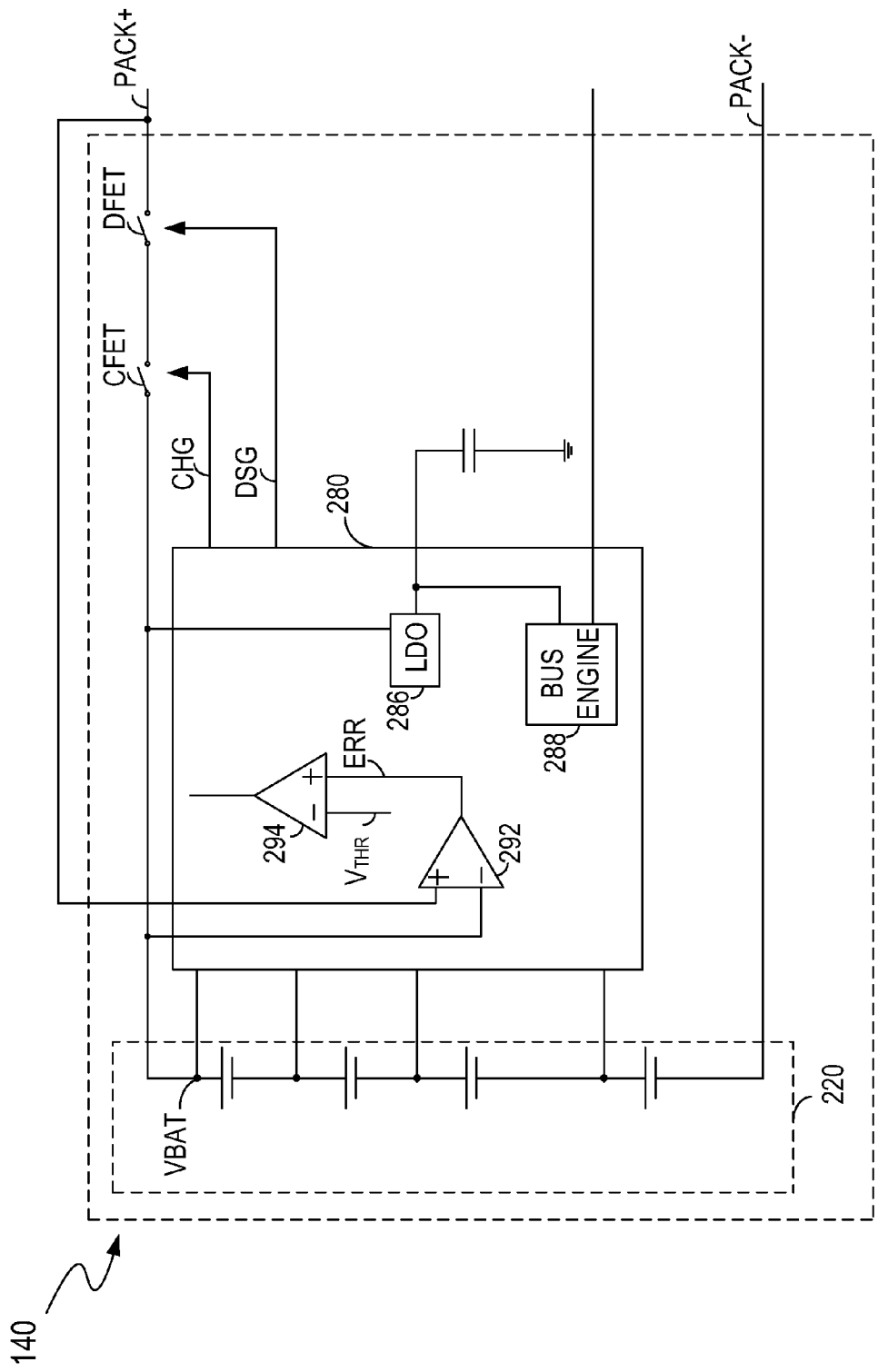
FIG. 2 shows a block diagram of a conventional battery management system.
Figure 3:
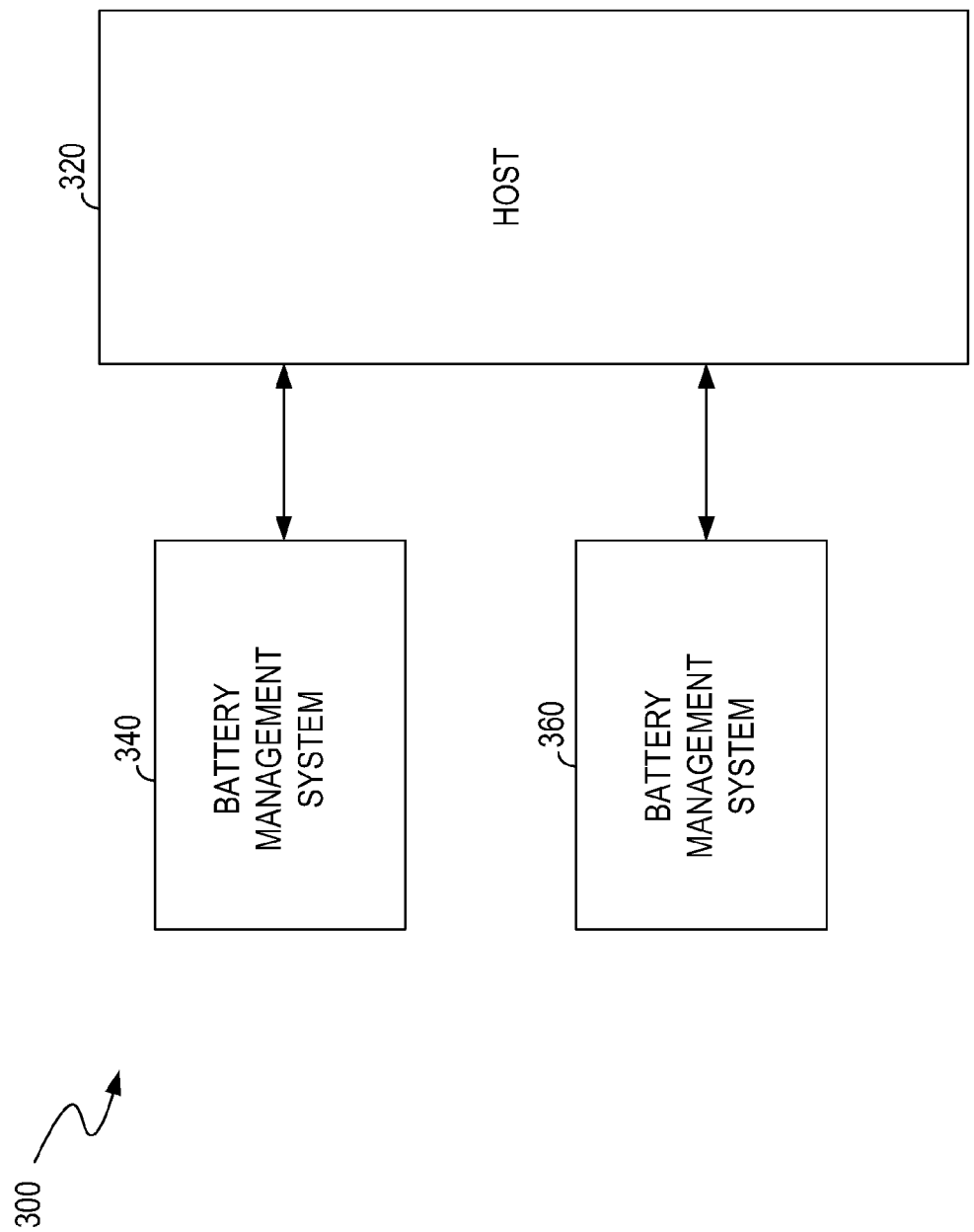
FIG. 3 shows a block diagram of an example of a host system, in an embodiment according to the present invention.

FIG. 3 illustrates a block diagram of an example of a host system 300, in an embodiment according to the present invention. In the example of FIG. 3, the host system 300 includes a host 320. The host 320 can be, but is not limited to, a mainboard of a notebook computer system. The host system 300 further includes battery management systems 340 and 360 for controlling charging and discharging of batteries included in the battery management systems 340 and 360 in response to a request signal from the host 320. Moreover, the battery management systems 340 and 360 protect the batteries included in the battery management systems 340 and 360 from undesirable or abnormal conditions, e.g., over-voltage, over-current, and under-voltage conditions. Although two battery management systems are disclosed in the example of FIG. 3, the host system 300 can include any number of battery management systems.

Figure 4:
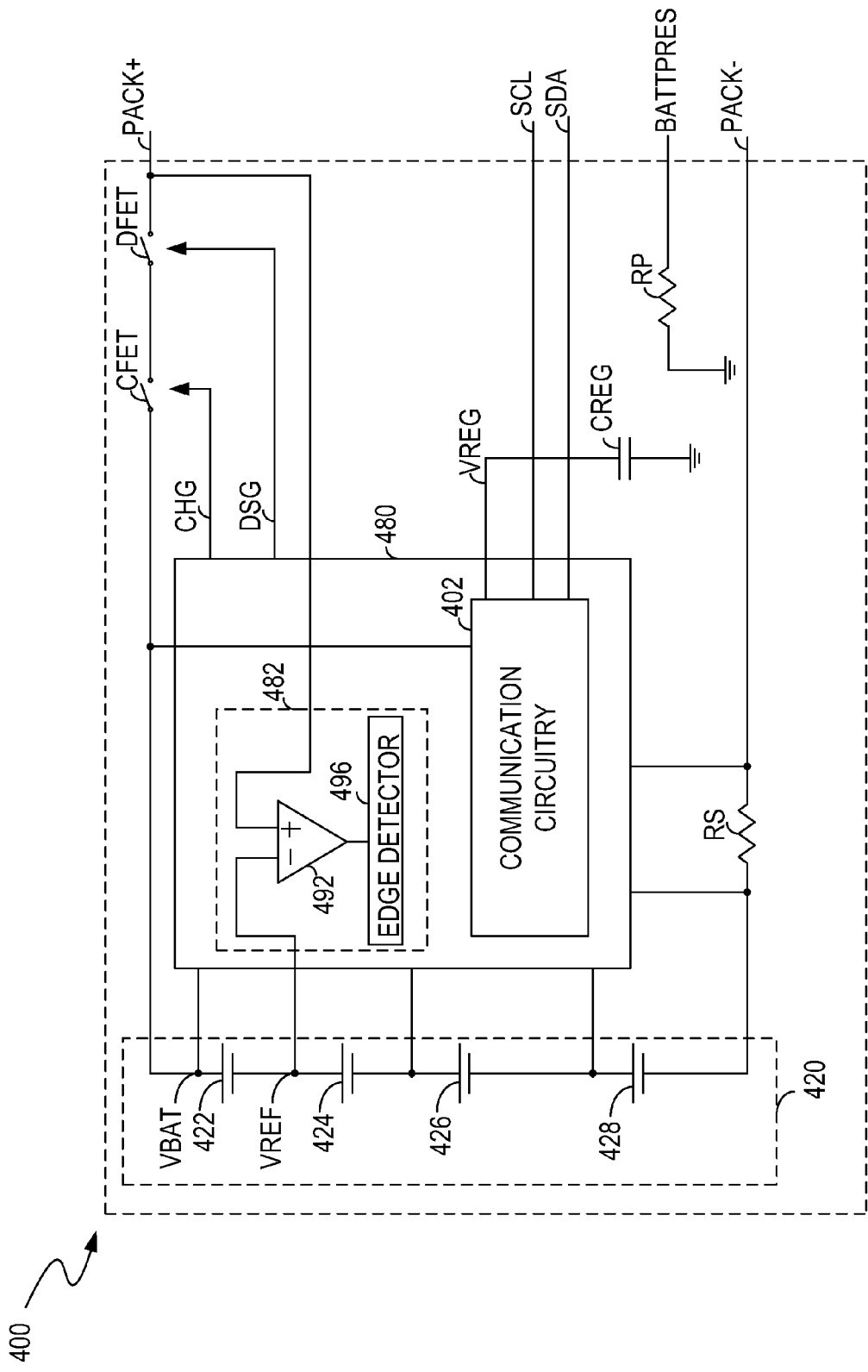
FIG. 4 shows a block diagram of an example of a battery management system, in an embodiment according to the present invention.

FIG. 4 shows an embodiment of a battery management system 400 which can be used as the battery management system 340 shown in FIG. 3. The battery management system 400 can be coupled to the host 320 in FIG. 3 via terminals PACK+ and PACK−. In one embodiment, the battery management system 360 in FIG. 3 has a structure similar to that of the battery management system 400. The battery management system 400 includes a battery 420, a controller 480, resistors RS and RP, a switch CFET that controls charging of the battery 420, a switch DFET that controls discharging of the battery 420, and a capacitor GREG. The controller 480 and the battery management system 400 can selectively operate in a set of modes such as a ship mode and a normal mode. The battery 420 includes battery cells 422, 424, 426 and 428 in the example of FIG. 4. However, the battery 420 can include any number of battery cells.

In one embodiment, the signal BATTPRES is used to inform the host 320 that the battery management system 400 is coupled to the host 320. The host 320 can receive the signal BATTPRES via a battery present detecting terminal of the host 320, and can send a request signal if the signal BATTPRES shows the battery management system 400 is coupled to the host 320. When the battery management system 400 is coupled to the host 320, BATTPRES is connected to the battery present detecting terminal, and when the battery management system 400 is decoupled from the host 320, BATTPRES is disconnected from the battery present detecting terminal. In one embodiment, if the battery management system 400 is decoupled from the host 320, the battery present detecting terminal of the host 320 is floating and has a first voltage level, e.g., 5V. If the battery management system 400 is coupled to the host 320, the host 320 receives the signal BATTPRES via the battery present detecting terminal. Due to the pull-down resistor RP, the signal BATTPRES and the voltage level of the battery present detecting terminal are pulled down to a second level, e.g., 0.5V.

The request signal from the host 320 requests the controller 480 to switch from operating in the ship mode to operating in the normal mode. The request signal can be a request signal $RQ_1$ sent to the terminal PACK+, or a request signal $RQ_2$ sent to communication circuitry 402 included in the controller 480 (the signals $RQ_1$ and $RQ_2$ are further discussed below). The communication circuitry 402 can communicate with the host 320 in both the ship mode and the normal mode, which will be detailed below.

In the ship mode, the controller 480 disables the switches CFET and DFET so as to disable charging and discharging of the battery 420. In one embodiment, the controller 480 can remain in the ship mode until receiving a request signal from the host 320.

In response to the request signal, the controller 480 controls the BMS 400 to switch to the normal mode under certain conditions. The conditions that allow the controller 480 to switch from the ship mode to the normal mode are further described below. In the normal mode, the controller 480 controls charging and discharging of the battery 420 by controlling the switches CFET and DFET.

Moreover, in the normal mode, the controller 480 protects the battery 420 from undesirable or abnormal conditions. More specifically, the controller 480 detects the statuses of the battery cells 422, 424, 426, and 428, such as cell voltages and a current flowing through the battery cells, and controls the switches CFET and DFET accordingly to control charging and discharging of the battery 420. For example, the controller 480 turns off the switch DFET via a signal DSG to stop discharging the battery 420 if the controller 480 detects a cell voltage of a battery cell 42$i$ ($i$=2, 4, 6 or 8) is below an under-voltage reference, and turns off the switch CFET via the signal CHG to stop charging the battery 420 if the controller 480 detects a cell voltage of a battery cell 42$i$ is above an over-voltage reference. In other words, the battery management system 400 enables and disables the switches CFET and DFET conditionally in the normal mode so as to enable charging and discharging of the battery 420 conditionally. The controller 480 detects the current flowing through the resistor RS to detect the current flowing through the battery cells.

In the example of FIG. 4, the battery management system 400 switches from operating in the ship mode to operating in the normal mode according to a switching signal $S_{482}$ (not shown). The controller 480 includes a switching signal generator 482 for generating the switching signal $S_{482}$ based on a comparison of a terminal voltage $V_{PACK+}$ at the terminal PACK+ and a reference voltage $V_{REF}$. In one embodiment, the switching signal generator 482 generates the switching signal $S_{482}$, if, for example $V_{PACK+}$ is initially less than $V_{REF}$ but then increases to a value greater than $V_{PACK+}$. The reference voltage $V_{REF}$ is less than a voltage $V_{BAT}$, which is the total of the cell voltages in the battery 420. For example, the reference voltage $V_{REF}$ can be the total of the cell voltages of the battery cells 424, 426 and 428. The reference voltage $V_{REF}$ can also be a total of cell voltages of any number or combination of the battery cells.

More specifically, if the terminal voltage $V_{PACK+}$ is less than the reference voltage $V_{REF}$, the controller 480 remains in the ship mode. If the terminal voltage $V_{PACK+}$ rises from a first voltage level that is less than the reference voltage $V_{REF}$ to a second voltage level that is greater than the reference voltage $V_{REF}$, the switching signal generator 482 generates a switching signal $S_{482}$ to switch the battery management system 340 from operating in the ship mode to operating in the normal mode. If the host 320 instructs the controller 480 to enter the ship mode while the terminal voltage $V_{PACK+}$ remains greater than the reference voltage $V_{REF}$, e.g., due to parasitic capacitance at the terminal PACK+, the controller 480 will still enter and remain in the ship mode as instructed instead of incorrectly switching back to the normal mode.

In the example of FIG. 4, the switching signal generator 482 includes a comparator 492 for comparing the terminal voltage $V_{PACK+}$ with the reference voltage $V_{REF}$. The switching signal generator 482 further includes an edge detector 496 for generating a switching signal $S_{482}$ if an edge (e.g., a rising edge) is detected at the output of the comparator 492.

In the ship mode, in one embodiment, the battery management system 340 is plugged into the host 320 and the host 320 is powered off. When the host 320, together with the battery management system 340, is then powered on via a VCC terminal (not shown) of the host 320, e.g., with power provided by a battery included in the battery management system 360 in FIG. 3 or a charger to the VCC terminal, the signal BATTPRES received at the battery present detecting terminal of the host 320 will be, e.g., 0.5V but not 5V. Thus, the host 320 determines that the battery management system 340 has been plugged into the host 320. The host 320 can request the battery management system 340 be enabled by powering the terminal PACK+. The terminal PACK+ for the battery management system 340 can be powered, e.g., by a battery included in the battery management system 360 in FIG. 3 or a charger. Thus, the terminal voltage $V_{PACK+}$ rises. The comparator 492 compares the terminal voltage $V_{PACK+}$ with the reference voltage $V_{REF}$. If the terminal voltage $V_{PACK+}$ rises to a level so that the comparator 492 outputs a rising edge, then the edge detector 496 outputs the switching signal $S_{482}$ to switch the BMS 340 from the ship mode to the normal mode. Thus, the battery 420 can be charged or discharged under the control of the controller 480.

Advantageously, when the host 320 instructs the battery management system 340 to enter the normal mode, e.g., by controlling another battery management system such as the battery management system 360 to provide power to the PACK+ terminal, even if the voltage $V_{PACK+}$ at the PACK+ terminal is less than the total voltage $V_{BAT}$, the battery management system 340 can still switch to the normal mode so long as the voltage $V_{PACK+}$ at the PACK+ terminal rises to greater than the reference voltage $V_{REF}$ ($V_{REF}<V_{BAT}$). Moreover, by switching the controller 480 to the normal mode from the ship mode based on the variation of the terminal voltage $V_{PACK+}$, the BMS 340 can avoid being switched to the normal mode incorrectly. For example, after switching from the normal mode to the ship mode, the controller 480 can remain in the ship mode if the terminal voltage $V_{PACK+}$ remains above the reference voltage $V_{REF}$ due to parasitic capacitance at the terminal PACK+.

The battery management system 400 can be used in various applications that are not limited to the host system 300 in FIG. 3. In one embodiment, the battery management system 400 is decoupled from any host. In one such embodiment, the battery management system 400 receives power at a terminal (e.g., the terminal PACK+) from a power source directly rather than receiving power in response to a request signal from a host. The terminal voltage $V_{PACK+}$ can rise to a voltage level that is greater than the reference voltage $V_{REF}$, and thus the battery management system 400 can be switched from the ship mode to the normal mode. The power source can be, but is not limited to, a charger. For example, when the battery management system 400 is in the ship mode and is to be tested, a charger can provide power to the terminal PACK+ to switch the battery management system 400 to the normal mode, and thus the battery management system 400 can be tested.

Furthermore, in another embodiment, the battery management system 400 in the ship mode is plugged into the host 320 and the host 320 is powered on. In one such embodiment, the host 320 can communicate with the communication circuitry 402, e.g., via a bus, when the battery management system 400 is in the ship mode. Here, the term "bus" includes an electrical wire used to transfer data and commands according to a transfer protocol. For example, a clock signal SCL and a data signal SDA can be transferred via the bus. Thus, based on the communication between the host 320 and the communication circuitry 402, the battery management system 400 can be switched from the ship mode to the normal mode in response to a request signal. Related operations are detailed in FIG. 5 and FIG. 6.

Figure 5:
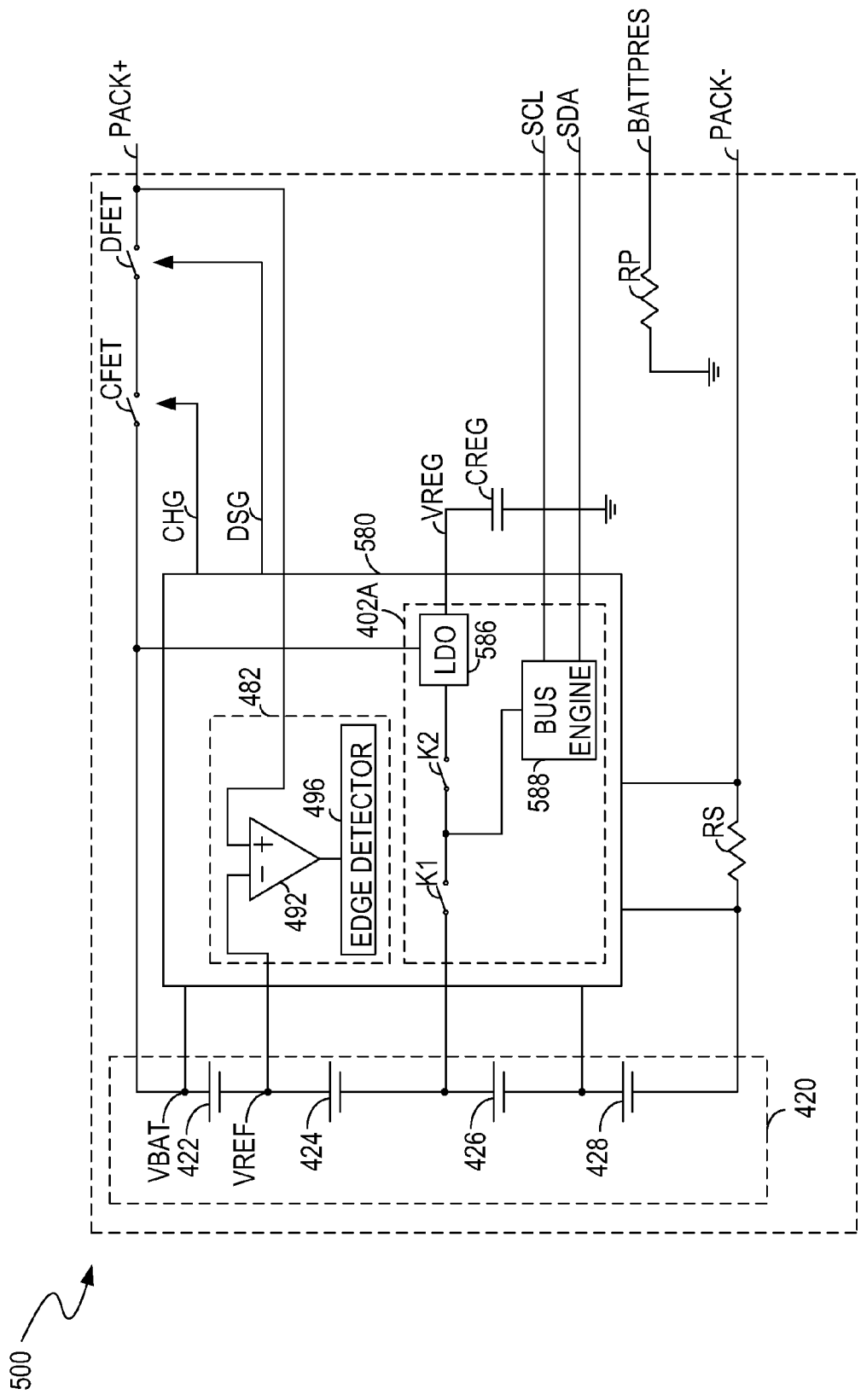
FIG. 5 shows a block diagram of an example of a battery management system, in an embodiment according to the present invention.

FIG. 5 shows one embodiment of a battery management system 500 which can be used as the battery management system 340 shown in FIG. 3. FIG. 5 is described in combination with FIG. 3 and FIG. 4. Elements labeled the same as in FIG. 4 have similar functions. The controller 580 in FIG. 5 is an embodiment of the controller 480 in FIG. 4. As shown in FIG. 5, communication circuitry 402A (which corresponds to communication circuitry 402 of FIG. 4) in the controller 580 includes a low-dropout regulator (LDO) 586 and a bus engine 588.

In the example of FIG. 5, the LDO 586 is disabled in the ship mode, and is enabled in response to a switching signal $S_{588}$ (detailed below) to generate a reference voltage VREG in the normal mode. The bus engine 588 transfers the signals SCL and SDA for the battery management system 340 in both the ship mode and the normal mode. In one embodiment, the signal SCL is a clock signal, and the signal SDA is a data signal. Moreover, in the ship mode, the bus engine 588 checks whether a request signal $RQ_2$ for the battery 420 to be enabled is received at the communication circuitry 402A by detecting the signals SCL and SDA, and generates the switching signal $S_{588}$ accordingly. More specifically, the combination of the signal SCL and the signal SDA includes requested address information for the battery to be enabled. The bus engine 588 stores the address information for the battery 420. The bus engine 588 checks whether the requested address information matches the address information for the battery 420. If the requested address information matches the address information for the battery 420, then the bus engine 588 determines that the request signal $RQ_2$ for the battery 420 is received and thus the battery 420 is to be enabled. The bus engine 588 generates the switching signal $S_{588}$ (not shown) if the request signal $RQ_2$ is received.

In the example of FIG. 5, the battery management system 500 also includes switches K1 and K2. In the ship mode, the LDO 586 is disabled and does not generate the reference voltage VREG, the switch K1 is on and the switch K2 is off, and thus the bus engine 588 is powered by the battery cells 426 and 428. In the normal mode, the LDO 586 is enabled and generates the reference voltage VREG, the switch K1 is off and the switch K2 is on, and thus the bus engine 588 is powered by the reference voltage VREG. In the ship mode, the bus engine 588 can be powered by any number of battery cells. The number of battery cells powering the bus engine 588 in the ship mode is determined by the operating voltages of the devices included in the bus engine 588. A total voltage of the battery cells powering the bus engine 588 in the ship mode can be greater than the operating voltage of each device included in the bus engine 588.

In the ship mode, in one embodiment, the battery management system 500 is plugged into the host 320 and the host 320 is powered on. In this situation, when the battery management system 500 in the ship mode is plugged into the host 320, the signal BATTPRES received at the battery present detecting terminal of the host 320 is, e.g., 0.5V, and therefore the host 320 determines the battery management system 500 is plugged in. The bus engine 588 then checks the clock signal CLK and the data signal SDA and determines whether the request signal $RQ_2$ is received according to the result of checking the clock signal CLK and the data signal SDA. If the request signal $RQ_2$ is received, the bus engine 588 sends a switching signal $S_{588}$ to switch the BMS 500 to the normal mode, and the bus engine 588 is switched to be powered by the reference voltage VREG. The controller 580 in the normal mode further checks the instruction information in the request signal $RQ_2$. For example, the controller 580 checks whether the request signal $RQ_2$ instructs the battery management system 500 to be charged or discharged. The controller 580 responds to the checking result. For example, if the request signal $RQ_2$ is for the battery 420 to be charged, the controller 580 turns on the switch CFET and turns off the switch DFET, and controls the charging of the battery 420.

In one embodiment, the controller 580 is integrated into a chip. The controller 580 includes a terminal for receiving power from battery cells 426 and 428, and includes a terminal for receiving the signal SCL and a terminal for receiving the signal SDA.

Advantageously, by controlling the switches K1 and K2 such that the bus engine 588 is powered in the ship mode, the controller 580 in the ship mode can communicate with the host 320 via the bus engine 588 and thus responds to the host 320. Moreover, the bus engine 588 can be a logic circuit; therefore, the power consumption of the bus engine 588 in the ship mode can be so little that the power consumption of the bus engine 588 can be ignored.

Figure 6:
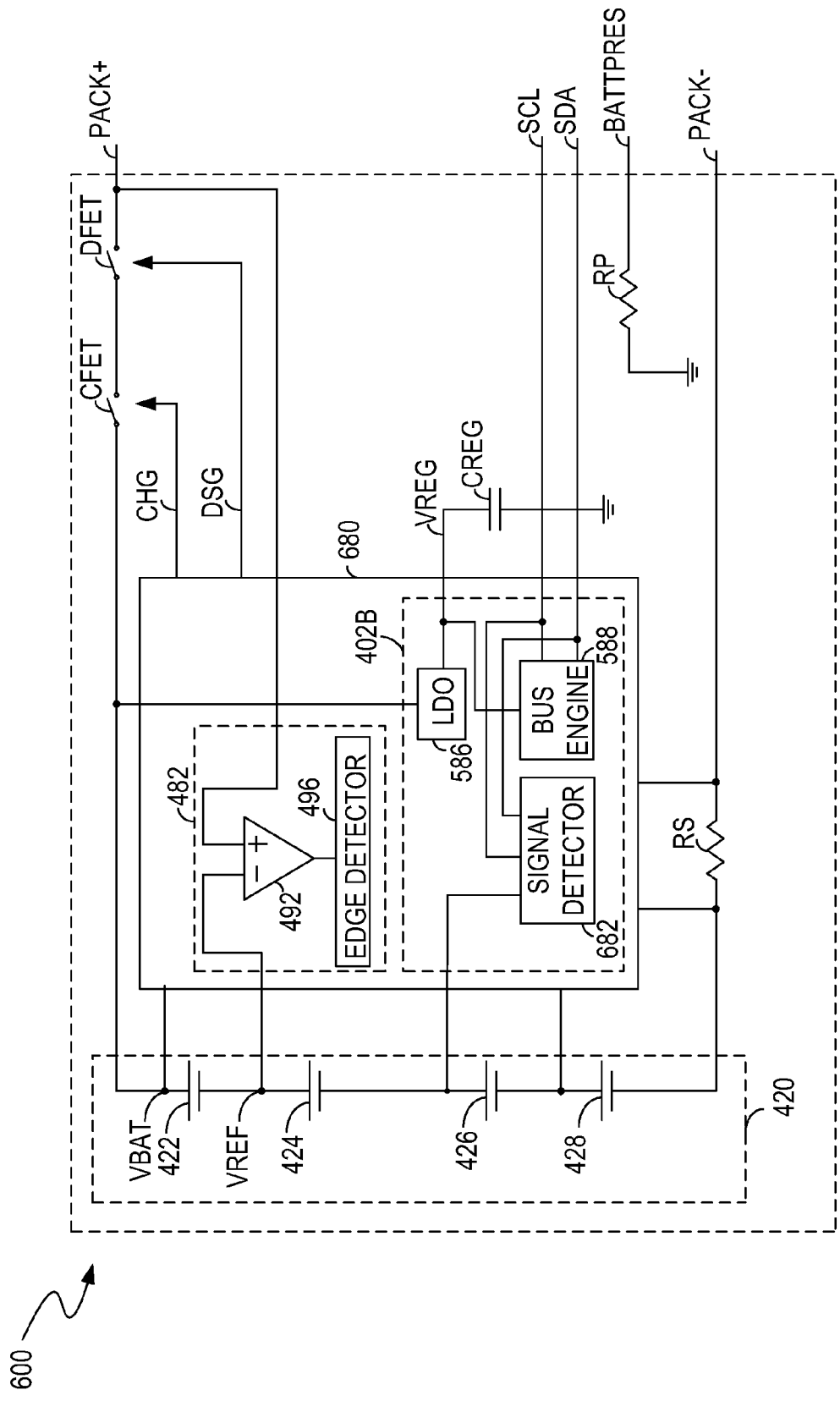
FIG. 6 shows a block diagram of an example of a battery management system, in another embodiment according to the present invention.

FIG. 6 shows another embodiment of a battery management system 600 which can be used as the battery management system 340 shown in FIG. 3. FIG. 6 is described in combination with FIG. 3, FIG. 4, and FIG. 5. Elements labeled the same as in FIG. 5 have similar functions. The controller 680 in FIG. 6 is an embodiment of the controller 480 in FIG. 4. As shown in FIG. 6, the structure of the controller 680 is similar to that of the controller 580 in FIG. 5, except communication circuitry 402B (which corresponds to communication circuitry 402 of FIG. 4). The communication circuitry 402B includes the LDO 586, the bus engine 588, and a signal detector 682. The signal detector 682 can detect the signals SCL and/or SDA.

In the example of FIG. 6, the signal detector 682 is powered by the battery cells 426 and 428. The signal detector 682 can be powered by any number of battery cells depending on the required operating voltages of the devices included in the signal detector 682. In the ship mode, the signal detector 682 can detect the signal SCL and/or the signal SDA, and generates a switching signal $S_{682}$ (not shown) accordingly. The battery management system 340 switches from operating in the ship mode to operating in the normal mode according to the switching signal $S_{682}$. For example, if the signals SCL and SDA meet the start/pause conditions for internal-integrated circuit (I2C) bus, the signal detector 682 generates the switching signal $S_{682}$ accordingly. In another embodiment, the signal detector 682 detects the signal SCL only, and generates the switching signal $S_{682}$ according to a presence of the signal SCL only. For example, if the voltage level of the signal SCL varies from a first level to a second level, the signal detector 682 generates the switching signal $S_{682}$ accordingly.

The LDO 586 is disabled in the ship mode, and is enabled in response to the switching signal $S_{682}$ to generate a reference voltage VREG to power the bus engine 588 in the normal mode. In the normal mode, the bus engine 588 transfers signals SCL and SDA for the battery management system 340, and checks whether a request signal $RQ_2$ for the battery 420 to be enabled is received at communication circuitry 402B, by detecting the signals SCL and SDA. For example, the bus engine 588 checks whether requested address information for the battery to be enabled matches the address information of the battery 420. If the requested address information matches the address information for the battery 420, the bus engine 588 determines that the request signal $RQ_2$ is received. Accordingly, the battery management system 600 controls charging or discharging of the battery 420. If the requested address information does not match the address information for the battery 420, the bus engine 588 determines that the request signal $RQ_2$ is not received. Accordingly, the battery management system 600 switches from operating in the normal mode back to operating in the ship mode.

Figure 7:
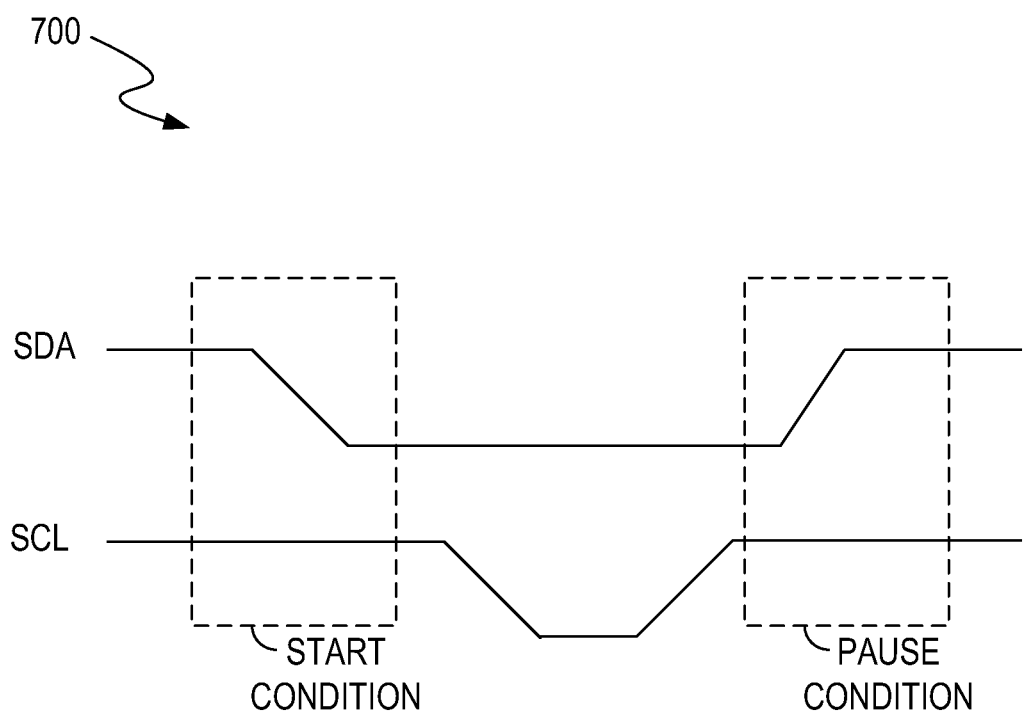
FIG. 7 shows examples of waveforms associated with a battery management system, in an embodiment according to the present invention.

FIG. 7 shows an example of the start/pause conditions for an I2C bus associated with the signal detector 682 in FIG. 6, in accordance with one embodiment of the present invention. In the example of FIG. 7, a falling edge of the signal SDA with logic high of the signal SCL meets the start condition, and a rising edge of the signal SDA with logic high of the signal SCL meets the pause condition. In one embodiment, if the signal detector 682 detects the start condition, the signal detector 682 responds as a request signal $RQ_2$ is received. In another embodiment, if the signal detector 682 detects both the start and the pause conditions, the signal detector 682 responds as a request signal $RQ_2$ is received.

Advantageously, by applying the signal detector 682 in the ship mode, the battery management system 600 can communicate with the host 320 in the ship mode and thus respond to the host 320. Moreover, the signal detector 682 can be a logic circuit; therefore, the power consumption of the signal detector 682 in the ship mode can be small enough that the power consumption of the signal detector 682 can be ignored.

Figure 8:
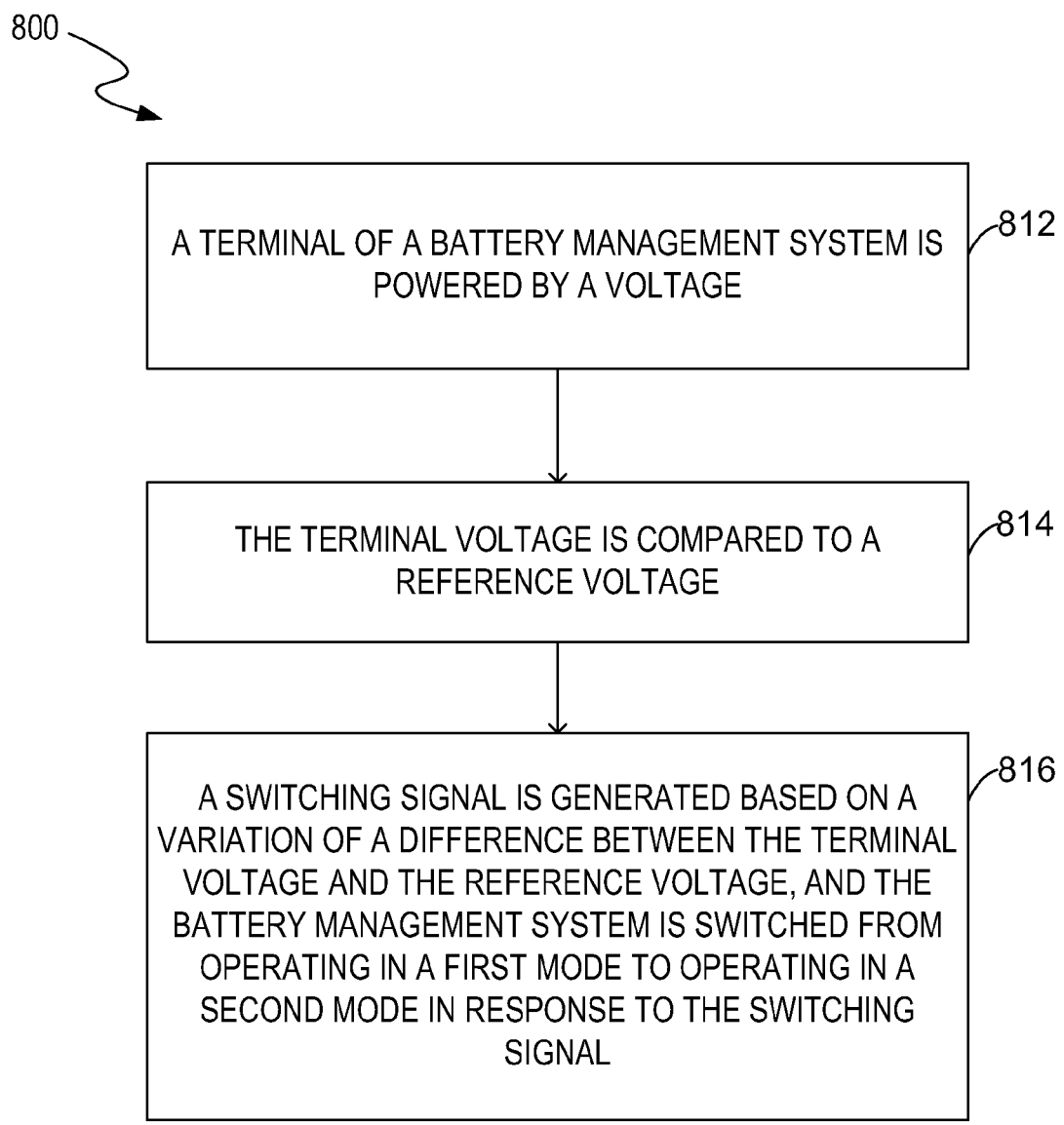
FIG. 8 shows a flowchart of an example of a method for controlling a battery management system, in an embodiment according to the present invention.

FIG. 8 illustrates a flowchart of an example of a method 800 for controlling a battery management system. FIG. 8 is described in combination with FIG. 4, FIG. 5 and FIG. 6. Although specific steps are disclosed in FIG. 8, such steps are examples. That is, the present invention is well suited to performing various other steps or variations of the steps recited in FIG. 8.

At step 812, a terminal PACK+ of the battery management system (e.g., 400, 500, or 600) is powered by a voltage that is, e.g., provided by a battery in another battery management system or provided by a charger according to a request signal, e.g., the request signal $RQ_1$, from a host. At step 814, the terminal voltage $V_{PACK+}$ at the terminal PACK+ is compared to a reference voltage $V_{REF}$. In one embodiment, the reference voltage $V_{REF}$ is less than a voltage $V_{BAT}$ of a total of cell voltages of the battery 420 included in the battery management system. At step 816, a switching signal $S_{482}$ is generated based on a variation of a difference between the terminal voltage $V_{PACK+}$ and the reference voltage $V_{REF}$. A controller (e.g., 480, 580, or 680) controls the battery management system to operate in a ship mode or in a non-ship mode in response to the switching signal $S_{482}$. The non-ship mode can be the normal mode. For example, the switching signal $S_{482}$ is generated if the terminal voltage $V_{PACK+}$ rises from a first level that is less than the reference voltage $V_{REF}$ to a second level that is greater than the reference voltage $V_{REF}$.

Figure 9:
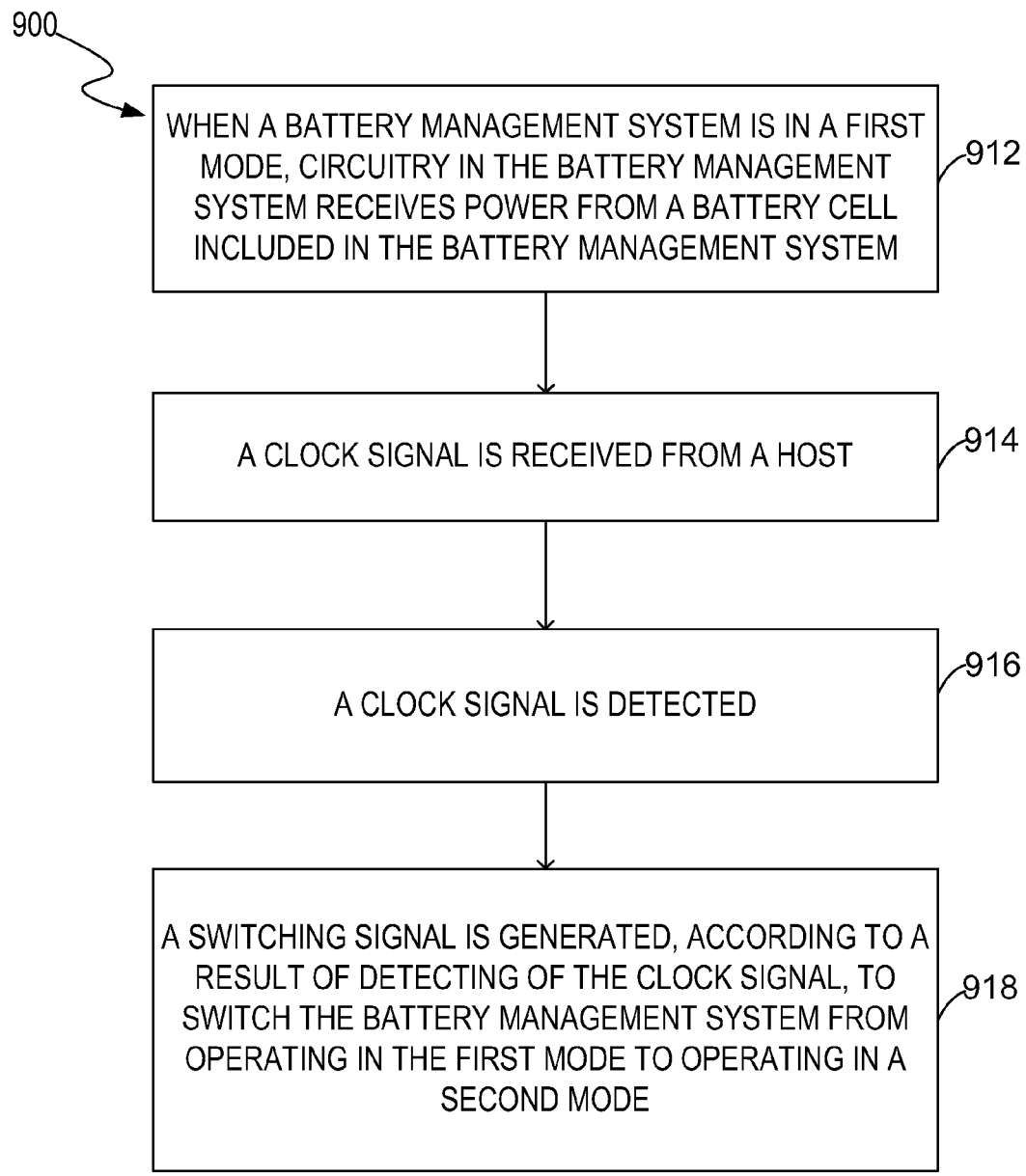
FIG. 9 shows a flowchart of an example of a method for controlling a battery management system, in an embodiment according to the present invention.

FIG. 9 illustrates a flowchart of an example of a method 900 for controlling a battery management system. FIG. 9 is described in combination with FIG. 5 and FIG. 6. Although specific steps are disclosed in FIG. 9, such steps are examples. That is, the present invention is well suited to performing various other steps or variations of the steps recited in FIG. 9.

At step 912, when the battery management system (e.g., 500 or 600) operates in a ship mode, circuitry (such as the bus engine 588 in FIG. 5 and the signal detector 682 in FIG. 6) included in the battery management system receives power from a battery cell included in the battery management system. In the ship mode, the battery management system 500 or 600 disables controlling of charging and discharging of a battery in the battery management system 500 or 600. At step 914, a clock signal SCL and/or a data signal SDA are received from a host, e.g., sent via a bus.

At step 916, the clock signal SCL and/or the data signal SDA is detected in the ship mode via communication circuitry, e.g., via the bus engine 588 or the signal detector 682. At step 918, a switching signal, e.g., the switching signal $S_{588}$ or $S_{682}$, to control the battery management system 500 or 600 to switch from operating in the ship mode to operating in a non-ship mode, is generated according to a result of detecting the clock signal SCL and/or the data signal SDA. The non-ship mode can be the normal mode. In the normal mode, the battery management system 500 or 600 enables controlling of charging and discharging of the battery in the battery management system 500 or 600. In one embodiment, the switching signal $S_{682}$ is generated according to a presence of the clock signal SCL, by the signal detector 682 powered by a battery included in the BMS 600, and according to whether a request signal for the BMS 600 to be enabled is received is checked in the normal mode by detecting the clock signal SCL and the data signal SDA, via the bus engine 588. The bus engine 588 in the example of FIG. 6 is powered by a reference voltage generated in the normal mode in response to the switching signal $S_{682}$. In another embodiment, whether a request signal for the BMS 500 to be enabled is received is checked in the ship mode by detecting the clock signal SCL and the data signal SDA, via the bus engine 588 in the example of FIG. 5. The bus engine 588 is powered by a battery cell in the BMS 500. The switching signal $S_{588}$ is generated if the request signal for the BMS 500 is received. In response to the switching signal $S_{588}$, the bus engine 588 is switched to be powered by a reference voltage, e.g., VREG.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention not limited to the foregoing description.

What is claimed is:

1. A controller for a battery management system, said controller comprising:
   a first terminal configured to receive power from a battery in said battery management system;
   a second terminal configured to receive a clock signal;
   communication circuitry, coupled to said first and second terminals, and operable for detecting said clock signal, and generating a first switching signal according to a result of detecting said clock signal to control said battery management system to switch from operating in a ship mode to operating in a non-ship mode according to said first switching signal, wherein said detecting and generating are performed with said battery management system in said ship mode,
   wherein said battery management system disables controlling of charging and discharging of said battery in said ship mode, and wherein said battery management system enables controlling of charging and discharging of said battery in said non-ship mode.

2. The controller of claim 1, wherein said communication circuitry generates said first switching signal according to a presence of said clock signal.

3. The controller of claim 1, wherein said controller further comprises a third terminal for receiving a data signal, and wherein said communication circuitry checks whether a request signal for said battery is received by detecting said clock signal and said data signal, in said non-ship mode.

4. The controller of claim 3, wherein said communication circuitry comprises:
- a signal detector that is powered by a battery cell in said battery, and that generates said first switching signal according to a presence of said clock signal in said ship mode;
- a regulator that is disabled in said ship mode, and that is enabled, in response to said first switching signal, to generate a reference voltage in said non-ship mode; and
- a bus engine that is powered by said reference voltage, and that checks whether said request signal is received by detecting said clock signal and said data signal, in said non-ship mode.

5. The controller of claim 1, wherein said communication circuitry further generates said first switching signal according to a data signal.

6. The controller of claim 5, wherein said controller further comprises a third terminal for receiving said data signal, and wherein said communication circuitry checks whether a request signal for said battery is received by detecting said clock signal and said data signal, and generates said first switching signal according to a result of checking whether said request signal is received, in said ship mode.

7. The controller of claim 6, wherein said communication circuitry comprises:
- a regulator that is disabled in said ship mode, and that is enabled, in response to said first switching signal, to generate a reference voltage in said non-ship mode; and
- a bus engine that, in said ship mode, is powered by a battery cell in said battery and generates said first switching signal if said request signal is received, that is powered by said reference voltage in said non-ship mode, and that transfers said clock signal and said data signal for said battery management system in both said ship and non-ship modes.

8. The controller of claim 1, further comprising:
- a switching signal generator, coupled to said battery, that compares a terminal voltage of said battery management system and a reference voltage, and that generates a second switching signal based on a variation of a difference between said terminal voltage and said reference voltage, wherein said reference voltage is less than a total of cell voltages in said battery, and wherein said battery management system switches from operating in a ship mode to operating in a non-ship mode according to said second switching signal.

9. The controller of claim 8, wherein said switching signal generator generates said second switching signal if said terminal voltage rises from a first voltage level that is less than said reference voltage to a second voltage level that is greater than said reference voltage.

10. The controller of claim 8, further comprising:
- a comparator, coupled to said battery, that compares said terminal voltage with said reference voltage; and
- an edge detector, coupled to said comparator, that generates said second switching signal if an edge is detected at an output of said comparator.

11. A battery management system, comprising:
- a battery that comprises a plurality of battery cells;
- a charging switch that controls charging of said battery and a discharging switch that controls discharging of said battery, wherein said battery management system disables said charging switch and said discharging switch in a ship mode to disable charging and discharging of said battery, and wherein said battery management system enables said charging switch and said discharging switch conditionally in a non-ship mode so as to enable charging and discharging of said battery conditionally; and
- a controller, coupled to said battery, that detects a clock signal in said ship mode, and generates a first switching signal according to a result of detecting of said clock signal in said ship mode, wherein said battery management system switches from operating in said ship mode to operating in said non-ship mode according to said switching signal.

12. The battery management system of claim 11, wherein said controller generates said first switching signal according to a presence of said clock signal.

13. The battery management system of claim 11, wherein said controller comprises:
- a signal detector that is powered by a battery cell in said battery, and that generates said first switching signal by detecting a presence of said clock signal in said ship mode;
- a regulator that is disabled in said ship mode, and that is enabled, in response to said first switching signal, to generate a reference voltage in said non-ship mode; and
- a bus engine that is powered by said reference voltage, and that checks whether a request signal for said battery to be enabled is received by detecting said clock signal and a data signal, in said non-ship mode.

14. The battery management system of claim 11, wherein said controller further checks, in said ship mode, whether a request signal for said battery to be enabled is received by detecting said clock signal and a data signal, and wherein said controller generates said first switching signal according to a result of checking of said request signal.

15. The battery management system of claim 11, wherein said controller further generates a second switching signal based on a variation of a difference between a terminal voltage of said battery management system and a reference voltage, wherein said reference voltage is less than a total of cell voltages in said battery, and said battery management system switches from operating in said ship mode to operating in said non-ship mode according to said second switching signal.

16. A method for controlling a battery management system, comprising:
- detecting a clock signal, in a ship mode, via communication circuitry; and
- generating a first switching signal, according to a result of detecting of said clock signal, to control said battery management system to switch from operating in said ship mode to operating in a non-ship mode,
- wherein said battery management system disables controlling of charging and discharging of a battery in said battery management system in said ship mode, and wherein said battery management system enables controlling of charging and discharging of said battery in said non-ship mode.

17. The method of claim 16, further comprising:
- checking in said non-ship mode whether a request signal for said battery to be enabled is received by detecting said clock signal and a data signal, via a bus engine in said communication circuitry.

18. The method of claim 17, further comprising:
- powering a signal detector in said communication circuitry via said battery to generate said first switching signal according to said clock signal;
- generating a reference voltage in response to said first switching signal; and
- powering said bus engine via said reference voltage.

19. The method of claim 16, wherein said generating said first switching signal comprises generating said first switching signal according to a presence of said clock signal.

20. The method of claim 16, further comprising:
generating a second switching signal based on a variation of a difference between a terminal voltage of said battery management system and a reference voltage, wherein said reference voltage is less than a total of cell voltages in said battery; and
switching said battery management system from operating in said ship mode to operating in said non-ship mode according to said second switching signal.

* * * * *